United States Patent [19]

Harley

[11] 4,089,614
[45] May 16, 1978

[54] FURNITURE CONNECTOR

[75] Inventor: David N. Harley, Bournemouth, England

[73] Assignee: ITW Limited, Windsor, England

[21] Appl. No.: 794,873

[22] Filed: May 9, 1977

[30] Foreign Application Priority Data

May 12, 1976 United Kingdom ............ 19514/76
Feb. 15, 1977 United Kingdom ............ 6201/77

[51] Int. Cl.² ............................................. B25G 3/00
[52] U.S. Cl. .................................... 403/407; 403/231; 312/195; 312/263
[58] Field of Search ............ 403/405, 406, 407, 231; 52/285, 582, 584; 297/440; 312/263, 195

[56] References Cited

U.S. PATENT DOCUMENTS

| 2,114,508 | 4/1938 | Steiner | 403/407 |
| 3,279,830 | 10/1966 | Strom | 403/406 |
| 3,676,898 | 7/1972 | Rock | 403/407 |
| 4,047,822 | 9/1977 | Lehmann | 52/285 X |

FOREIGN PATENT DOCUMENTS

| 2,254,289 | 5/1974 | Germany | 403/231 |
| 2,358,163 | 6/1974 | Germany | 403/231 |
| 2,408,349 | 9/1975 | Germany | 403/231 |
| 2,546,749 | 4/1977 | Germany | 403/407 |

Primary Examiner—Wayne L. Shedd
Attorney, Agent, or Firm—Jack R. Halvorsen; Robert W. Beart

[57] ABSTRACT

The invention concerns a furniture connector assembly including a plug, a fastener, and a grommet, the plug being a substantially cylindrical component and having at least one flat side face, a spigot extending radially and obliquely from the side face and being penetrated by a bore, and the grommet comprising a substantially cylindrical shank having a locating surface at one of its ends, and being further formed with a bore extending through the shank, the bore being inclined to the axis of the shank, the fastener passing, in use, through the bore in the plug and extending into the bore in the grommet.

15 Claims, 11 Drawing Figures

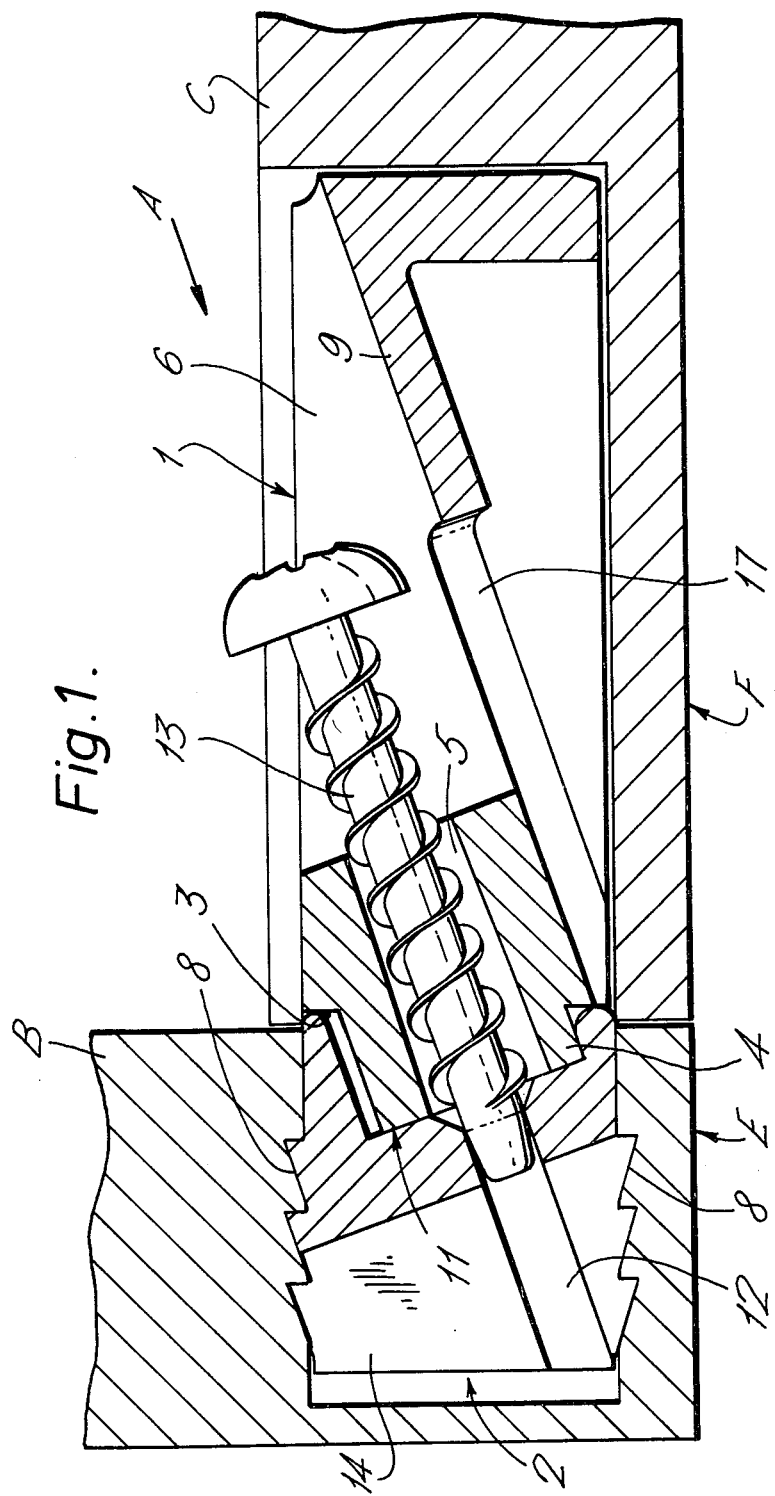

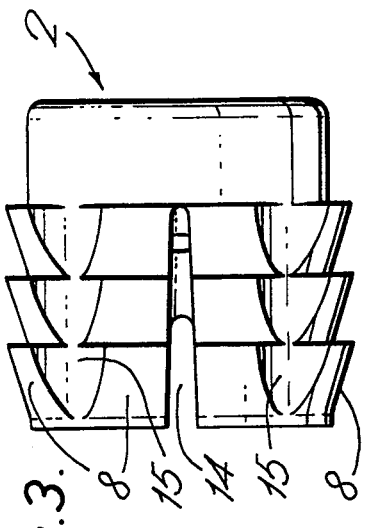
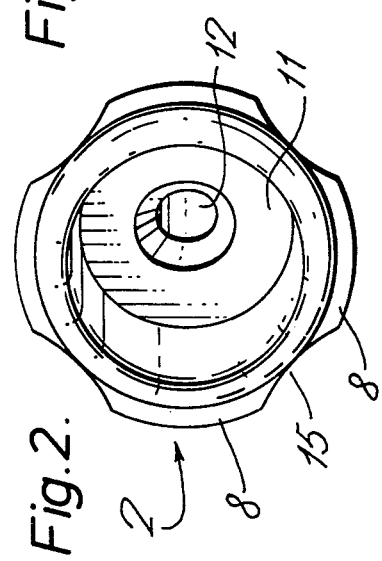
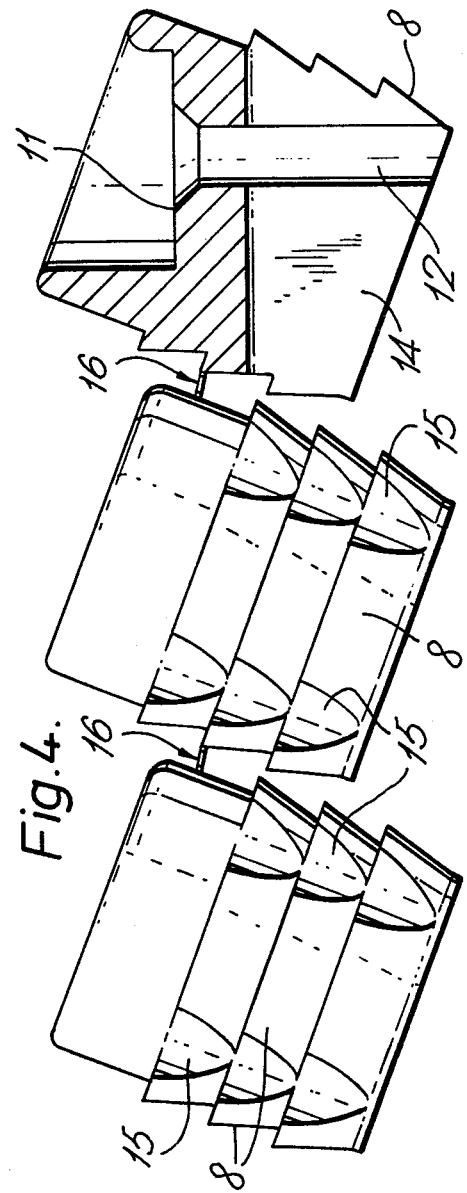

FURNITURE CONNECTOR

The invention concerns connectors for use in home-assembly furniture, and is particularly concerned with injection-moulded plastics plugs and grommets for use in such connectors.

In order that home-assembly furniture may be quickly and easily constructed by a relatively unskilled person, it has been found to be essential that joints between panels are provided by the use of connectors applied to the panels at the factory where automatic insertion of the parts of the connector to the appropriate panels can be employed.

Various devices are currently used, but the security of the joint obtained is not always commensurate with the degree of complexity of the connector assembly.

The plug and grommet constructions of the previous application have also been found to have a number of disadvantages when in use, particularly with materials other than wooden panels, their main problem being that the exposed panel edge and the exposed face of the other panel are not always flush.

Accordingly, it is the aim of the present invention to provide a furniture connector of a simple, rugged construction which ensures a secure joint between two panels and requires a minimum of skill on the part of the installer.

The connector, which comprises a plug and a grommet, is readily adaptable to automatic insertion in wooden panels in that alignment of the two parts is facilitated by the moulded configurations of the plug and grommet. To allow rapid insertion of grommets by machine, the grommets may be joined together in side-by-side rows, or sticks, each grommet aligned in the same way as the others. Grommets may then be fed to an inserting machine rapidly, with correct alignment ensured.

The plug is of a shape which can only be inserted in its correct alignment in a panel with an aperture in a face and open to one edge, so that alignment of the plug is easily ascertained and ensured.

According to the present invention, a furniture connector assembly includes a plug, a fastener, and a grommet, the plug being a substantially cylindrical component and having at least one flat side face, a spigot extending radially and obliquely from the side face and being penetrated by a bore, and the grommet comprising a substantially cylindrical shank having a locating surface at one of its ends, and being further formed with a bore extending through the shank, the bore being inclined to the axis of the shank, the fastener passing, in use, through the bore in the plug and extending into the bore in the grommet.

According to a second aspect of the present invention, a plug for a furniture connector includes a substantially cylindrical body having one flat side face, a spigot extending radially and obliquely from the side face and being penetrated by a longitudinal bore, the body portion being formed with circumferentially extending external barbs, the barbs preferably extending in planes parallel to the axis of the bore in the spigot.

Preferably, the body portion is substantially circular in plan, but it may be configured in other ways to suit different panel materials. For example, a keyhole or a "T" type of configuration may be used to bring highly stressed areas away from the edge of the panel when the material of the panel is susceptible to tearing.

To allow the plugs to be formed simply by an injection moulding process using a simple two-part mould, it is necessary to adopt a configuration for the plug which allows the mould parts to be made in such a way that they separate in directions along the axis of the bore in the spigot.

According to a further aspect of the present invention, a grommet for use in a furniture connector comprises a substantially cylindrical shank, having locating surfaces at one of its ends, the shank being further formed with a circular bore extending through the shank and penetrating the ends of the shank, the axis of the bore being inclined to, and intersecting, the axis of the shank. The axes of the bore and the shank may intersect at a point within or outside the length of the shank. The shank may also include a transverse slot extending completely or partially across the shank at its end remote from the locating surfaces.

Circumferential barbs may be formed on the outer surface of the shank of the grommet, either extending completely around the shank, or formed in longitudinal rows separated by flattened areas or flutes. A connector including a plug and a grommet according to the present invention will now be described, with reference to the accompanying drawings, in which:

FIG. 1 shows a cross-section of a preferred connector, including a plug and a grommet according to the present invention.

FIGS. 2 and 3 are end and side views of a preferred embodiment of the grommet, respectively.

FIG. 4 is a part-sectional view of a plurality of grommets formed as a single unit.

Figure 5:
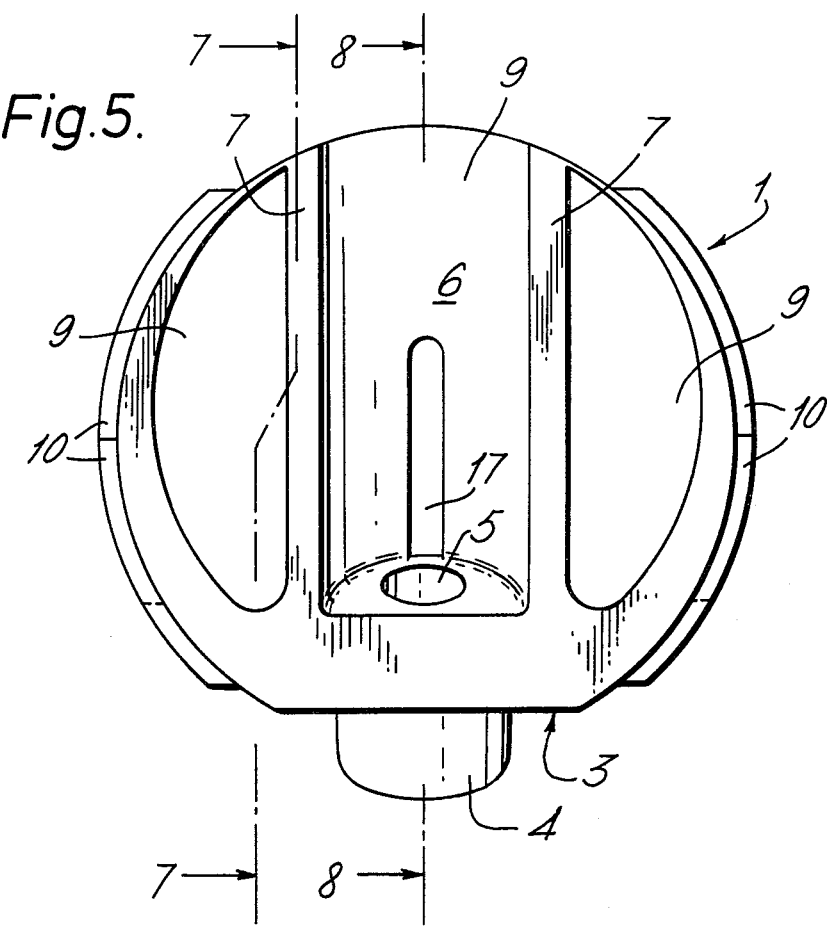
FIG. 5 is a top view of a plug according to the present invention.

Referring now to the drawings, in FIG. 1 there is seen a furniture connector joining two panels B and C at right angles. The connector comprises a plug 1, a grommet 2, and a screw 13 extending through an inclined bore 5 in the plug into a bore 12 in the grommet, in the direction of the arrow A. Preferably, the screw has a cylindrical shank of a diameter substantially equal to the diameter of the bore in the grommet, and has a screw thread extending from a point near the tip of the shank to the base of the head, leaving a cylindrical shank portion at the leading end of the screw. This shank portion ensures that the screw is driven into the bore in the grommet in correct alignment with the bore.

Figure 8:
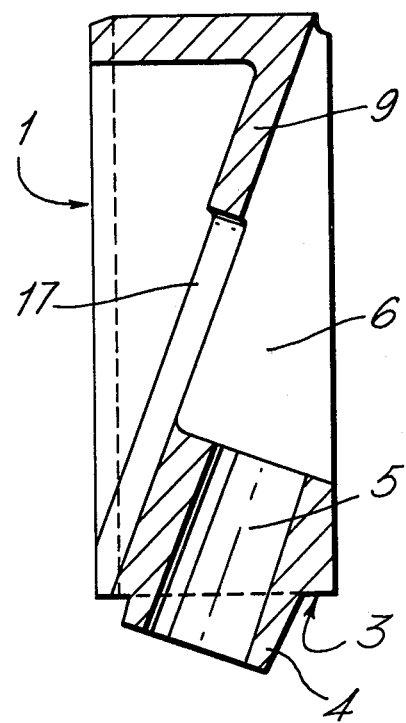
FIG. 8 is a cross-section taken along the line 8—8 of FIG. 5.

The plug 1, seen in plan in FIG. 5, is a generally disc-like component formed with a segment removed to provide a flat side face 3 on which is formed a spigot 4, extending radially with respect to the plug and inclined to the flat side face 3, the inclined bore 5 passing through the spigot 4. The bore 5 communicates with a depression 6 in the plug, best seen in FIG. 8, allowing access to the screw head for driving.

Reinforcing ribs 7 extend across the plug 1 on each side of the bore 5, the ribs dividing a floor 9 into three parts. The floor 9 and ribs 7 serve to strengthen the plug, and prevent it from being deformed under stress.

The plug 1 has a number of barbs 10 formed on its outer surface, the barbs 10 extending circumferentially round the body and being also formed to extend in planes parallel to the axis of the bore 5.

The floor 9 preferably also extends in a plane parallel to the axis of the bore 5, and this configuration allows the body, spigot, ribs, floor and barbs to be formed integrally in a two-part mould, the mould parts separating in directions parallel to the axis of the bore 5 in the plug.

The grommet 2, seen in FIGS. 1 to 3, is a generally cylindrical component, formed with a locating surface 11 at its end to co-operate with the end of the spigot 4 on the plug. The locating surface is aligned in a plane perpendicular to the axis of the bore 12, so that the end surface of the spigot 4, and the locating surface 11 are not urged to slide relative to one another when the screw 13 is tightened. Circumferential barbs 8 on the outer surface of the grommet grip the panel, to ensure that the grommet is held securely against withdrawal from the panel. Flutes 15 formed on the surface of the grommet separate the barbs 8 into four series of barbs. The presence of the flutes prevents the grommet rotating about its axis after it is inserted in a panel, and thus maintains the correct alignment between the grommet and the plug. A bore 12 is formed in the grommet, inclined to the axis of the grommet at an angle of approximately 20° to be in alignment with the direction of insertion of the screw.

The grommet is also formed with a radial or diametral slot 14, intersecting the bore 12, at the end of the grommet remote from the locating surface 11. This slot provides for expansion of the end of the grommet when the screw is driven in to the bore 12, so that a firm grip on the panel is ensured.

It will be appreciated that alignment of the bores in the two parts of the connector is important. This is greatly facilitated by a feature of the invention to be described below, in relation to automated insertion techniques.

To install the connector, a blind bore is drilled in the panel B to receive the grommet, and a recess is formed in the edge of the panel C to receive the plug. The grommet 2 is then inserted into the blind bore, with the locating surface 11 exposed and bore 12 in the grommet aligned as shown in FIG. 1, and the plug is fitted in the recess in the panel C, with its flat side 3 face substantially flush with the edge of panel C. Then the two panels are offered up together so that the end of the spigot 4 abuts the locating surface 11 on the grommet to align the bores 5 and 12 in the two components. Then, a screw 13 is placed in the recess 6 in the plug and is then passed through the bore 5 and driven into the bore 12 in the grommet, to secure the plug and grommet together, and thus complete the joint.

The insertion of the screw into the grommet causes the grommet to expand radially, due to the presence of a slot 14 in the grommet. The slot 14 is preferably smaller in width than the diameter of the bore 12 and extends radially with respect to the axis of the grommet, intersecting the bore 12. The radial expansion of the grommet ensures that the barbs 8 grip the panel B, preventing the grommet from being pulled out of the panel by normal loads.

The joint is readily released by withdrawal of the screw.

Figure 11:
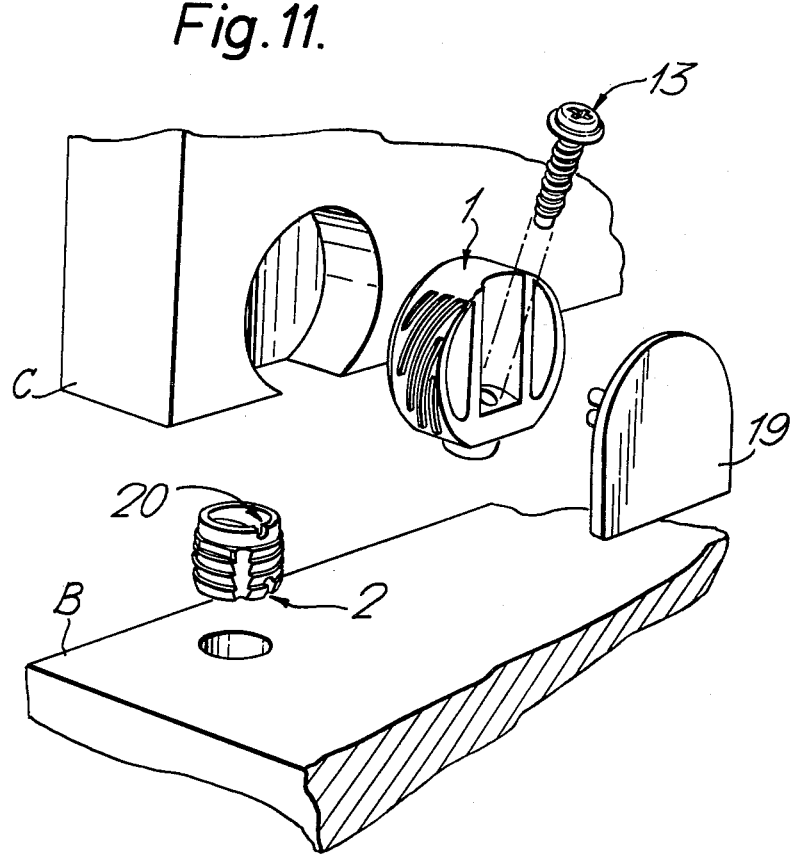

A cover plate 19, shown in the exploded view of the assembly seen in FIG. 11, may be added to conceal the plug top and the screw head after the joint is assembled. The cover plate is preferably a slightly dished plate of 'D' shape, and is positioned to conceal the otherwise exposed plug 1. The straight edge of the cover plate lies in the plane of the flat side face 3 of the plug, abutting the panel B (FIG. 1). The cover plate is preferably retained by a bifurcated projection extending from the concave face of the cover plate and being retained in a slot 17 in the floor 9 of the plug 1.

Referring now to FIGS. 2 and 3, there is shown a preferred embodiment of the grommet. This preferred grommet has flutes 15, separating the barbs 8 into four series of barbs. The barbs are preferably formed near the end of the grommet remote from the locating surface, so that when the grommet is inserted into a panel, the barbs are spaced below the surface of the panel. This helps to prevent fractures appearing in any veneer applied to the face of panel B.

The locating surfaces 11, inclined bore 12, and slot 14 are all as previously described with reference to the grommet shown in FIG. 1.

FIG. 4 shows the grommet of FIG. 1 in a form adapted for automatic insertion. As can be seen, the grommets are moulded as a 'stick', i.e. as a plurality of grommets formed identically and joined by the thin, frangible webs 16. This feature greatly facilitates automatic insertion of the grommets into preformed apertures, in that the grommets can be fed to an inserter from a magazine. It is stressed that the grommets moulded in the stick are all aligned in the same way, i.e. both the axes of all the grommets are parallel, and the axes of all the bores 12 are parallel, ensuring identical alignment of grommets fed to the machine. During insertion, the webs 12 will break to separate the inserted grommet from the remainder of the stick.

To allow re-alignment of a grommet installed incorrectly, a radial slot or other configuration may be provided in the end of the grommet, the slot being engaged by a tool to permit rotation of the grommet to the desired orientation. The grommet 2 seen in FIG. 11 has such a slot, indicated by reference numeral 20.

The main advantages obtained by using the plug and grommet of the present invention are that firstly a more accurate location of the two panels is achieved, the surfaces E and F seen in FIG. 1 may be precisely aligned to produce a flush joint before the screw is driven home, and secondly the problem of cracking veneers on the plugged panels is overcome, because the barbs 10 tend to draw the plug deeper into the panel, concentrating stresses away from the surface.

Joint accuracy is achieved by using the end surface 11 of the spigot to locate the plug and grommet together. These surfaces are perpendicular to the axis of the screw, thus side forces on the locating surfaces due to the force exerted by the screw are eliminated.

Due to the inclined configuration of the barbs 10, on the plug 1, no resistance is offered by them to the force exerted by the screw when it is driven in and tightened, as the force exerted by the screw is totally parallel to the barbs. This causes the plug to be urged into tighter engagement with the panel by moving deeper into the recess in which the plug is situated. Thus, stresses are channelled away from the surface of the panel and this reduction of surface stress ensures that a veneer applied to the surface of the panel will not be cracked when the screw is tightened to secure the joint.

Figure 6:
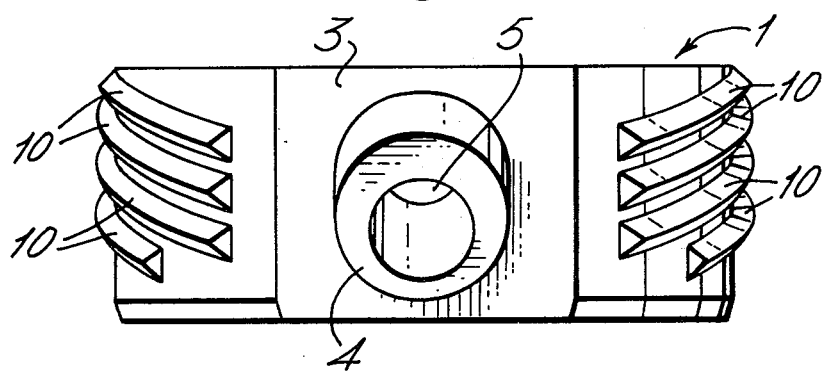
FIG. 6 is a view of the plug in a direction normal to its flat side face.
Figure 7:
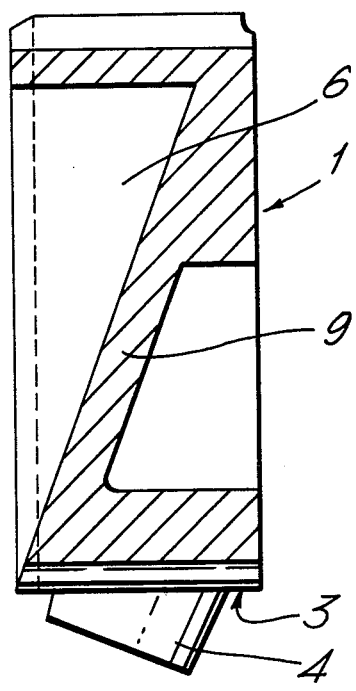
FIG. 7 is a cross-section taken along the line A—A of FIG. 5.
Figure 9:
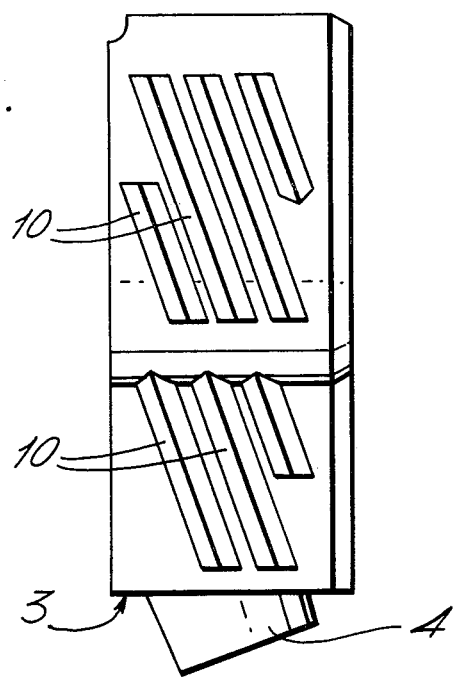
FIGS. 9 and 10 are side and top views respectively of a second type of plug according to the invention; and, FIG. 11 shows an exploded perspective view of the connector shown in FIG. 1.
Figure 10:
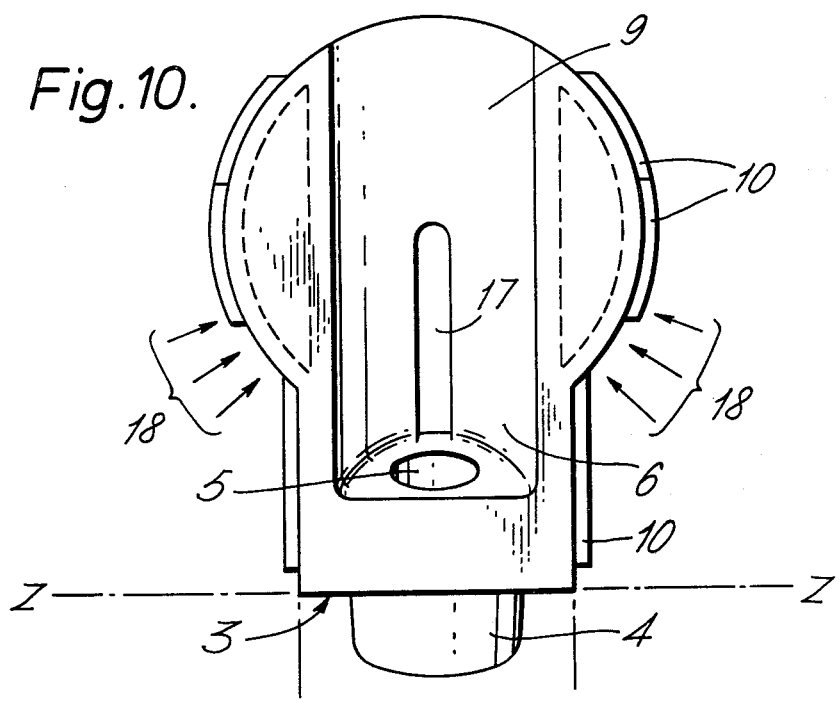

FIGS. 9 and 10 show an alternative configuration of the plug, intended for use in panels of softer materials than wood. In this type of material, the substantially circular plug seen in FIGS. 1 and 5 tends to split the edge of the panel, but with the plug shown in FIGS. 6 and 7 this problem is overcome, as the edge of the panel is not subjected to such high stresses. The main stress-bearing areas are shown by the arrows 18, and it can be seen that the stressed areas are well spaced from the edge of the panel into which this plug is inserted, the edge of the panel lying along the line Z-Z in FIG. 10.

The plug and grommet may be made from any rigid thermoplastics material.

I claim:

1. A furniture connector assembly including a plug, a fastener, and a grommet wherein said plug has a substantially cylindrical shape and has at least one flat side face, said plug being further formed with a spigot extending radially and obliquely from said flat side face with respect to the axis of said plug, said spigot including a bore extending the entire length of said spigot, and said grommet including a substantially cylindrical shank and having a locating surface at one of its ends to abut the free end of said spigot on said plug, said grommet also having a bore passing through said shank, said bore being inclined to the axis of said shank of said grommet, said fastener passing, in use, through said bore in said spigot of said plug and into said inclined bore in said grommet shank.

2. A furniture connector assembly according to claim 1, wherein the sum of the acute angles between said axis of said plug and the direction of said bore in said plug, and said axis of said grommet and the direction of said inclined bore in said grommet, is 90°.

3. A furniture connector according to claim 1, wherein said plug includes a floor extending across said plug in a plane parallel to said direction of said bore in said spigot.

4. A furniture connector according to claim 3, wherein said plug includes reinforcing webs extending across said plug.

5. A furniture connector according to claim 1, wherein circumferential barbs are formed on the outer surface of said plug, said barbs extending in planes parallel to the direction of said bore in said plug.

6. A furniture connector according to claim 1, wherein said locating surface in said grommet is planar, and is arranged to be perpendicular to said direction of said inclined bore in said grommet.

7. A furniture connector according to claim 1, wherein said grommet is formed at its end remote from said locating surface with a slot extending radially with respect to said axis of said grommet, said slot intersecting said inclined bore in said grommet.

8. A furniture connector according to claim 7, wherein the width of said slot in said grommet is less than the diameter of said inclined bore.

9. A furniture connector according to claim 1, wherein circumferentially extending barbs are formed on the surface of said grommet.

10. A furniture connector according to claim 9, wherein said barbs on said grommet are separated into longitudinal rows of barbs by longitudinal flutes.

11. A furniture connector according to claim 1, wherein said fastener is a screw with a self-forming thread.

12. A plug for use in a furniture connector according to claim 1.

13. A grommet for use in a furniture connector according to claim 1.

14. A plurality of grommets according to claim 13, wherein said grommets are connected together in a row by means of frangible webs, said grommets being arranged in such a way that said axes of said grommets are all parallel, and said directions of said inclined bores are also all parallel.

15. A plurality of grommets according to claim 14, formed integrally from plastics material.

* * * * *